United States Patent Office 3,524,070
Patented Aug. 11, 1970

3,524,070
DEVICE FOR VOLTAGE CONTROL OF THE ELECTRIC TRACTION MOTORS OF A.C. THERMAL-ELECTRIC VALVE DRIVE
Alexandr Dmitrievich Stepanov, 11 Parkovaya ulitsa 44, korpus 1, kv. 182; Vitaly Ivanovich Anders, Tverskaya-Yamskaya ulitsa 2/11, kv. 60; and Nikolai Lavrentievich Kostev, Kuzminskaya ulitsa 22, kv. 19, all of Moscow, U.S.S.R.
Filed Feb. 28, 1967, Ser. No. 619,289
Int. Cl. B60l *11/08;* B61c *9/38*
U.S. Cl. 290—14           7 Claims

ABSTRACT OF THE DISCLOSURE

Devices for providing an adequate voltage control of the electric traction motors of A.C. thermal-electric drives such as employed in gas-turbine-electric locomotives, diesel-electric locomotives, diesel-electric trains, tractors or the like in which an electric drive embodying a synchronous generator and A.C. traction motors is used. The device serves for voltage control of a synchronous generator according to the operation regime of the thermal prime mover and A.C. electric motors in traction and braking conditions for ensuring a maximum efficiency and a maxium power factor of the traction motors at various current frequencies in the traction regime and for torque control of the electric motors in braking regimes. In braking regimes, the device ensures the limiting of the power of traction electric motors, the limiting of the excitation current of the synchronous generator, and the limiting of the braking torque of the electric motors.

---

The present invention relates to devices meant for providing an adequate voltage control of the electric traction motors of A.C. thermal-electric drives such as are employed in gas-turbine-electric locomotives, oil-electric locomotives, diesel-electric trains, tractors and the like wherein an electric drive comprising a synchronous generator and A.C. traction motors is employed.

Thermal-electric drives for locomotives, e.g. gas-turbine-electric locomotives, are known to be in use—such drives usually being made up of a two-shaft gas turbine set, a synchronous generator for supplying the traction electric motors and an exciter of the synchronous generator (see, S. A. Gromov, L. A. Schevchenko "A.C. Gas-Turbine-Electric Locomotive," Bulletin of the VNIIZhT All-Union Railway Engineering Scientific Research Institute, 1962, No. 5).

The above mentioned drive does not provide for voltage control of the synchronous generator under varying duty conditions of the prime mover and the induction motors and, as a result, the drive losses are rather considerable.

Besides, when the electric drive operation under braking conditions till full stop of the locomotive, a braking curve conformable with the limiting factors imposed by the maximum field current, the adhesion between the locomotive wheels and the running rails and, likewise, by the braking resistor capacity cannot be obtained.

It is therefore a primary object of the present invention to provide a maximum efficiency and maximum power factor of the electric traction motors at various frequencies under traction duty conditions, which can be attained, as is known, by varying the voltage across the electric motors in a specific manner according to the frequency of the synchronous generator.

It is another object of the present invention to obtain a braking curve in conformity with the above mentioned limiting factors when the electric drive operates under braking conditions and the braking energy is absorbed during the braking period in constant resistors, this being likewise attained by varying the voltage across the electric motors during their operation under generator duty conditions.

A favourable solution of said problems is attained in the device proposed herein for voltage control of the traction motors of an A.C. thermal-electric drive with a synchronous generator by supplying the field winding of the synchronous generator from a source of alternating current through a rectifier connected to the output of a magnetic amplifier having at least three control windings, one of these control windings being connected to the terminals of the synchronous generator through a choke coil and rectifier bridge, whereas the second control winding is connected to the synchronous generator through a comparator unit and the third winding serves for receiving a signal from the gas turbine, the first and second windings having a cumulative connection, while the third winding is connected in opposition, i.e. differential, to them.

It is advisable to use a potentiometer as the comparator unit connected to the second control winding for comparing a rectified voltage of the synchronous generator with the rectified voltage proportional to a signal supplied to the third control winding from the two-shaft gas turbine.

A stabilivolt connected to the synchronous generator through a voltage divider and rectifier bridge may also serve as a comparator.

Any of three following methods can be employed for supplying the signal from the two-shaft gas turbine to the third control winding. An A.C. tachometer-generator may be mounted on the shaft of the compressor for a gas turbine prime mover, and the tachometer-generator voltage used for the signal to the third winding through an R–L–C resonance circuit and a rectifier. Another system for providing the desired third winding signal is by a D.C. tachometer-generator mounted on the shaft of the compressor turbine, wherein the signal supplied from the tachometer-generator to the third winding is provided by applying the difference in voltage between the tachometer-generator output voltage and a constant voltage source, such as a storage battery. Yet a further system for providing the signal from the gas turbine to the third control winding is through an inductive converter of mechanical movement into electric signals comprising an inductance coil having a core that is linked with the fuel supply mechanism of the compressor turbine.

The voltage across the electric traction motors can be maintained at a constant level (beginning from a certain moment) by connecting a second rectifier bridge supplied from the synchronous generator in series with the rectifier bridge of the first control winding of the magnetic amplifier.

In order to stabilize the operation of the system, it is recommended to provide the magnetic amplifier with supplementary control windings connected to the field winding of the synchronous generator through a capacitor or a stabilizing transformer.

The invention will further be described by way of example with reference to the accompanying drawings in which.

Figure 1:
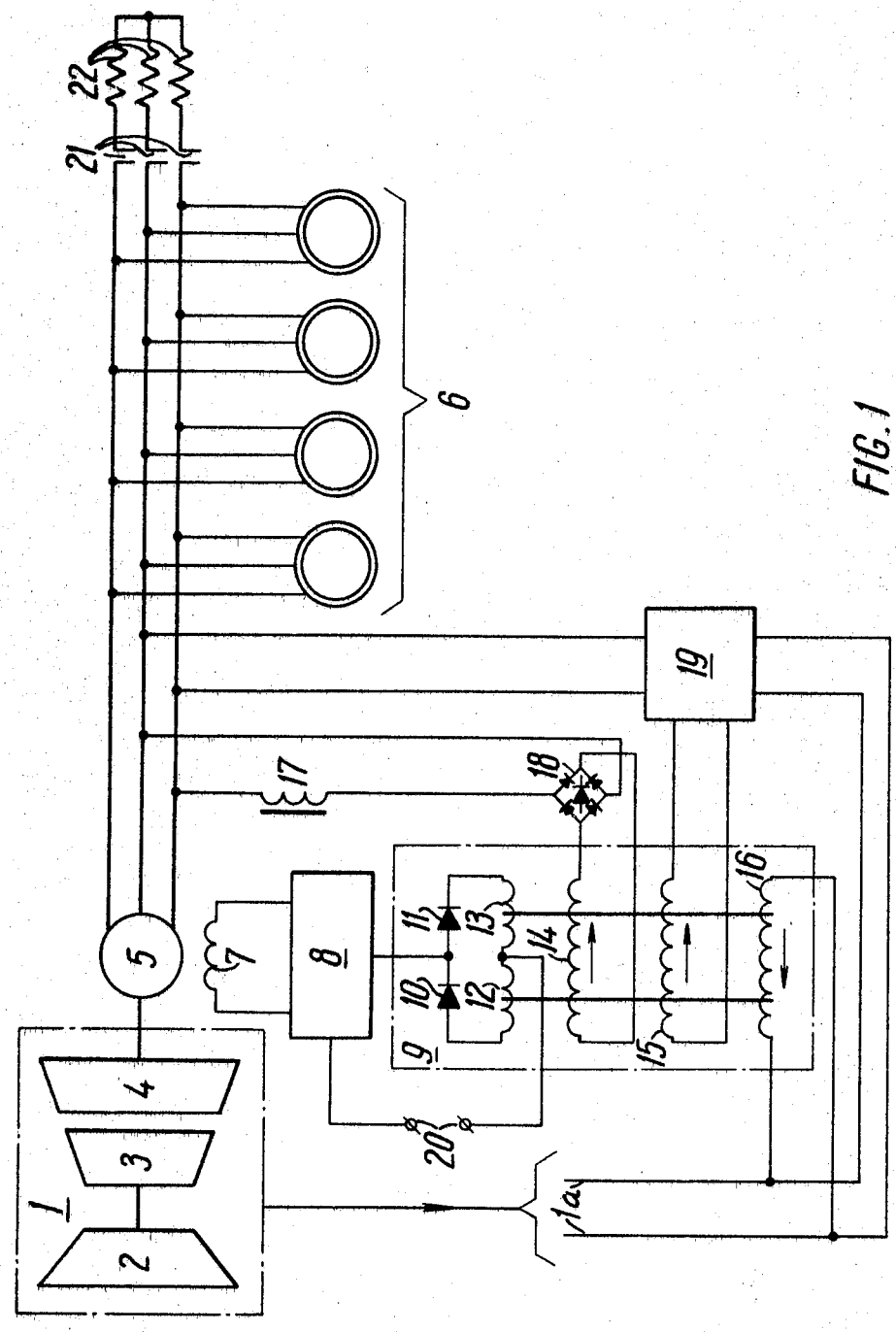
FIG. 1 shows the elementary circuit diagram of the system of the present invention as applied to a gas-turbine-electric locomotive with a two-shaft gas turbine set.

As is seen from FIG. 1, the system of the present invention comprises a two-shaft gas turbine set 1 made up of a compressor 2 driven by a compressor turbine 3 and a driving turbine 4 imparting rotation to a synchronous generator 5. The synchronous generator 5 supplies A.C. traction motors 6, the speed of the latter being controlled by changing frequency "$f$" which is proportional to the speed "$n$" of driving turbine 4.

At a constant torque on the shaft of electric motors 6 operating under traction duty conditions, voltage "V" is to vary approximately in proportion with its frequency "$f$" for ensuring optimum duty conditions of the motors.

$$V = K_1 f \tag{1}$$

At a constant output of electric motors 6, the required mode of variation of voltage "U" approaches the following equation:

$$V = K_2 \sqrt{f} \tag{2}$$

where $K_1$ and $K_2$ are proportionality factors.

The voltage across the electric motors 6 is varied by controlling the current flowing through a field winding 7 of synchronous generator 5. To this end, the field winding 7 is supplied from a rectifier 8 connected to the output of a magnetic amplifier 9.

The magnetic amplifier 9 has an internal positive feedback brought about by rectifiers 10 and 11 connected in series with operating windings 12 and 13 of magnetic amplifier 9. The magnetic amplifier 9 is provided with three control windings 14, 15 and 16. The supply circuit of control winding 14 consists of a choke coil 17 and rectifier bridge 18 connected to the voltage of synchronous generator 5. The control winding 15 is supplied from a comparator unit 19, the voltage of synchronous generator 5 being applied to one side of the comparator unit and a signal generated by the gas-turbine set 1 being applied by lines 1a, to the other side of the comparator unit. The signal produced by the gas-turbine set 1 is also delivered by lines 1a to the control winding 16. The rectifier 8 and magnetic amplifier 9 are supplied from a source of alternating current (terminals 20). Control windings 14 and 15 have a cumulative connection and control winding 16 is connected in opposition (differential) to them (shown in FIG. 1 by arrows).

At braking conditions of operation of the electric drive, braking resistors 22 are connected in parallel to the electric traction motors 6 by means of a circuit breaker 21.

When the electric drive operates under braking conditions till full stop, a braking curve in conformity with the above mentioned limiting factors can be obtained by varying the voltage across electric traction motors 6 during their operation under generator duty conditions, this being accomplished in the following manner.

The maximum field current limitations of synchronous generator 5 can be met by varying the generator voltage V according to the frequency approximately in compliance with Formula 1. The adhesion limitations can be met provided the braking torque of electric traction motors 6 is maintained at an approximately constant level by varying the voltage of synchronous generator 5 according to the frequency in compliance with Formula 2. The capacity limitations of braking resistors 22 can be met by maintaining the voltage at a constant level, i.e. if $$V = \text{const.} \tag{3}$$

Figure 2:
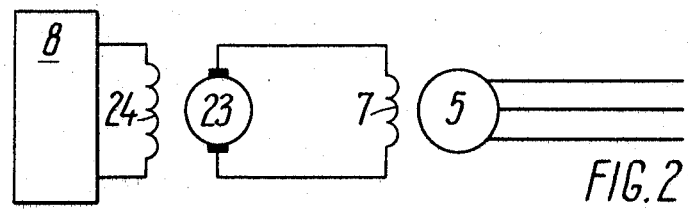
FIG. 2 shows the synchronous generator field winding supplied from an exciter circuit.

The field winding 7 of synchronous generator 5 may also be supplied from an exciter 23 (see FIG. 2), the field winding 24 of the latter being connected to the output of rectifier 8, whereas the exciter 23 may be driven by the compressor turbine 3 or, alternatively, by a separate engine (not shown in FIG. 2) operating at a constant speed.

Figure 3:
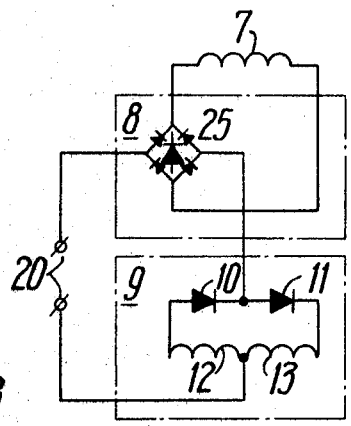
FIG. 3 shows the synchronous generator field winding supplied from an uncontrolled rectifier circuit.
Figure 4:
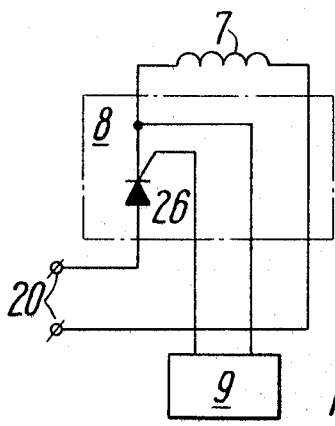
FIG. 4 shows the synchronous generator field winding supplied from a single-phase controlled rectifier circuit.

The rectifier 8 connected to the output of magnetic amplifier 9 may be either of an uncontrolled type incorporating an uncontrolled rectifier bridge 25 (see FIG. 3), or of a controlled type with a controlled diode (thyristor) 26 (see FIG. 4) the control electrode of which is connected to the output of magnetic amplifier 9.

The controlled rectifier 8 may employ a great variety of differential and bridge circuits with thyristors supplied from a singlephase or multiphase A.C. source (terminals 20). As the magnetic amplifier 9 is provided with an internal positive feedback and presuming that its amplification factor is sufficiently high, it can safely be assumed that $$F_{14} + F_{15} \approx F_{16} \tag{4}$$

where $F_{14}$, $F_{15}$ and $F_{16}$ are the magnetizing forces of control windings 14, 15 and 16 (see FIG. 1).

As mentioned above, the control winding 14 is connected to the synchronous generator 5 through the choke coil 17 having an inductive reactance $L_1$ and resistance $r_1$, and rectifier bridge 18 connected to the synchronous generator 5. Current $i_{14}$ flowing through the control winding 14 (the direction of the current is shown in FIG. 1 by an arrow) is equal to:

$$i_{14} = \frac{C_1 V}{\sqrt{(2\pi f L_1)^2 + r_2 + r_{14}}} \tag{5}$$

where $r_{14}$ is the resistance of control winding 14;
$C_1$ is a constant coefficient.

At low values of $r_1$ and $r_{14}$ as compared with inductive reactance $L_1$, the current flowing through the control winding 14 is equal to:

$$i_{14} \approx \frac{C_1 V}{2\pi L_1 f} \tag{6}$$

Consequently, in this case magnetizing force $F_{14}$ of control winding 14 is approximately proportional to the ratio of voltage V to frequency, i.e.:

$$F_{14} = K_1 \frac{V}{f} \tag{7}$$

The voltage "V" versus frequency "$f$" curve can be varied by adjustment of resistance $r_1$ and inductive reactance $L_1$ which can be changed according to the frequency by a proper selection of the magnetic saturation of the core of the choke coil 17. A curve close to Formula 2 can be obtained by making use of control winding 15 supplied from the comparator unit 19 to one side of which, as indicated above, the voltage of synchronous generator 5 is supplied, whereas the other side receives the signal that is supplied from the gas-turbine set 1.

Figure 5:
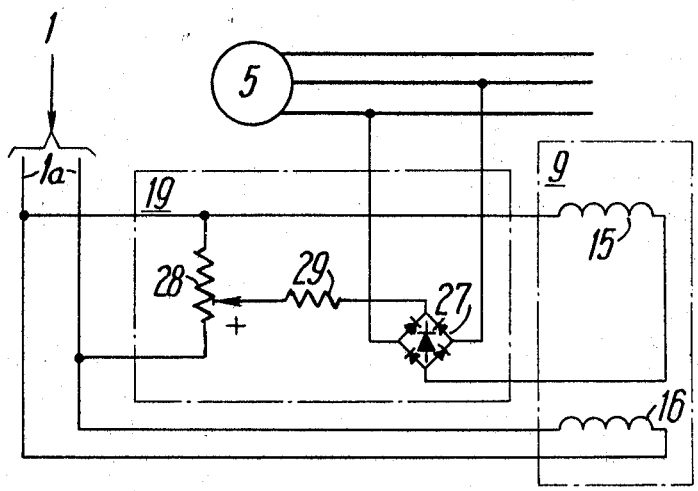
FIG. 5 shows the circuit diagram of a comparator unit employing a potentiometer.

The circuit of comparator unit 19 can be made up of a rectifier bridge 27, potentiometer 28 and resistor 29 as shown in FIG. 5. The rectifier bridge 27 is connected to the synchronous generator 5, and the potentiometer 28 receives the signal supplied from the gas-turbine set 1. The difference in rectified voltages of synchronous generator 5 and a part $V_0$ of the voltage across the potentiometer 28 is applied to the control winding 15. At such a connection, the value of current $i_{15}$ flowing through the control winding 15 (the direction of the current is shown in FIG. 1 by an arrow) is determined by the following equation:

$$i_{15} \cong \frac{V-V_0}{r_{15}+r_{29}} \quad (8)$$

where $r_{15}$ is the resistance of control winding 15.

The magnitude of $U_0$ is selected so as to obtain the following equation at frequency $F_1$ (see FIG. 7):

$$V_0 = V \quad (9)$$

Then, at frequencies below $f_1$ the rectifier bridge 27 becomes non-conductive and the flow of current through the control winding 15 will be zero.

At high voltages, a current that increases with the voltage of synchronous generator 5 will flow through the control winding 15. The dependence of magnetizing force $F_{15}$ of control winding 15 can be expressed approximately by the following equation:

$$F_{15} = K_2(f-f_1) \quad (10)$$

The slope of curve $F_{15}|f|$ (not shown in the figures) depends upon the value of resistance 29.

Figure 6:
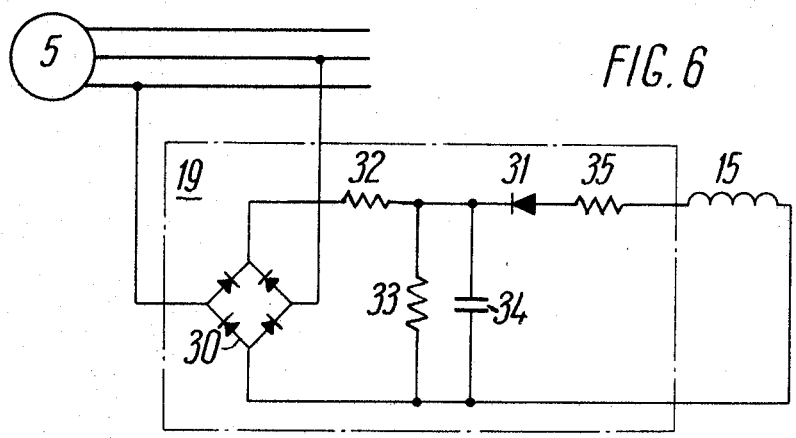
FIG. 6 shows the circuit diagram of a comparator unit employing a stabilivolt.

The circuit of comparator unit 19 may also be made up of a rectifier bridge 30 (see FIG. 6) connected to synchronous generator 5, stabilivolt 31, voltage divider consisting of resistors 32 and 33, capacitor 34 for smoothing out the pulsations and resistor 35. At a certain speed of synchronous generator 5, the voltage generated by the latter will exceed the set voltage $V_0$, stabilivolt 31 becomes conductive and a current that increases with the voltage of synchronous generator 5 begins to flow through the control winding 15. In this case, the dependence of magnetizing force $F_{15}$ of control winding 15 is approximately expressed by the same Formula 10. The slope of curve $F_{15}|f|$ depends upon the value of resistance 35.

At a constant value of the signal supplied from gas-turbine set 1, magnetizing force $F_{16}$ of control winding 16 is a a constant level.

Therefore, at a change in frequency "f" from zero to $f_1$ (see FIG. 7) $F_{15}=0$ and the device maintains a constant ratio of the voltage to frequency determined by Equation 7. When frequency $f > f_1$, magnetizing force $F_{15}$ increases with the frequency and, as a result, the value of $F_{15}$ drops.

In this case, the voltage increases with the frequency, but at a lower rate than the frequency across section $f_1-f_2$ (see FIG. 7), and the voltage varies according to a curve that is close to Equation 2.

Figure 8:
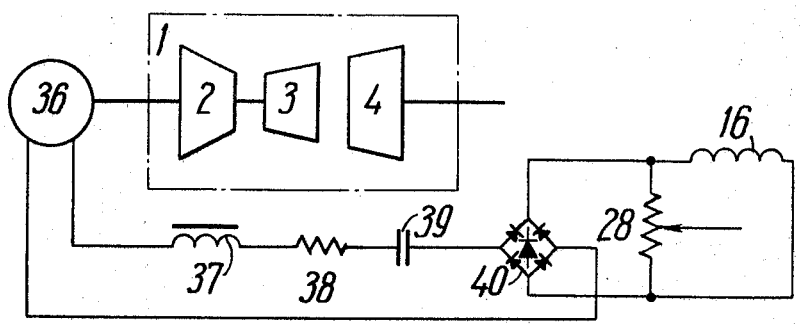
FIG. 8 shows the magnetic amplifier third winding supplied from an A.C. tachometer-generator circuit.

In order to improve the efficiency of operation of the electric drive at a reduction of the speed of compressor turbine 3, the voltage of synchronous generator 5 is to be varied in a definite manner. To this end, it is necessary to vary the supply of the signal from the gas turbine set 1 to the control winding 16 according to a certain law. In cases when an A.C. tachometer-generator 36 is mounted on the shaft of compressor turbine 3 (see FIG. 8), the signal can be supplied to the control winding 16 through a resonance circuit made up of an inductance 37, resistance 38, capacitance 39 and rectifier bridge 40.

A proper selection of the values of parameters 37, 38 and 39 enables a dependence of the current flowing through control winding 16 on the speed of compressor turbine 3 to be attained at which the efficiency of operation of the electric drive is maximum.

Figure 9:
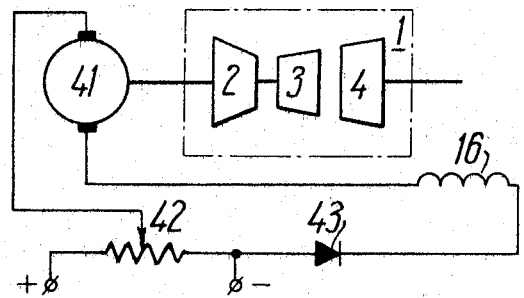
FIG. 9 shows the magnetic amplifier third winding supplied from a D.C. tachometer-generator circuit.

A circuit made up of a D.C. tachometer-generator 41 (see FIG. 9) driven by the compressor turbine 3, potentiometer 42 connected to a storage battery and rectifier 43 may be employed instead of the resonance circuit for supplying the control winding 16. This also enables to obtain the required dependence of the current flowing through control winding 16 on the speed of compressor turbine 3.

Figure 10:
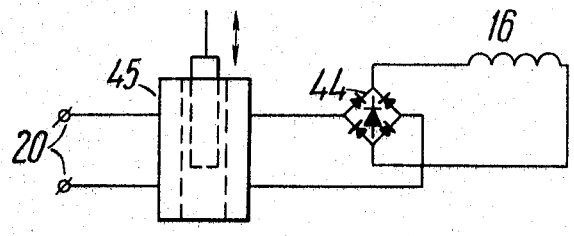
FIG. 10 shows the magnetic amplifier third winding supplied from an inductive converter circuit.

In certain cases it is recommended to control the excitation of synchronous generator 5 in relation to the position of the fuel supply mechanism instead of the angular velocity of the compressor turbine 3. To this end, the control winding 16 is connected through a rectifier 44 (see FIG. 10) to the output of an inductive converter 45 of mechanical movement into electric signals. At any change in position of the fuel supply mechanism (for example, the rods of the fuel pumps), the signal supplied to the control winding 16 is correspondingly varied, thus causing a change in the voltage of synchronous generator 5.

Figure 11:
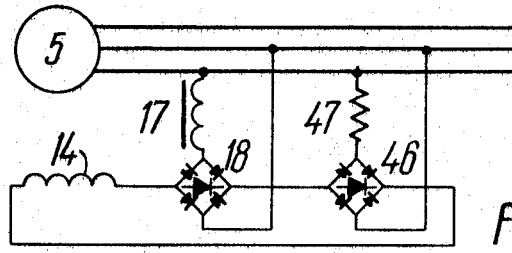
FIG. 11 shows the magnetic amplifier first winding supplied via a supplementary bridge circuit for maintaining the synchronous generator voltage at a constant level.

The inductive converters is supplied from a source of alternating current (terminals 20). A constant voltage is maintained in accordance with Equation 3 across the terminals of synchronous generator 5 beginning from frequency $f > f_2$ (see FIG. 7) by means of a supplementary bridge 46 (see FIG. 11) connected in series with the rectifier bridge 18 and control winding 14 and supplied from the synchronous generator 5 through a resistor 47 or, alternatively, through an insulating transformer (not shown in FIG. 11). At such a connection of bridges 18 and 46 the current flowing through the control winding 14 depends upon which of the signals supplied to the bridges 18 and 46 is the greatest.

Figure 7:
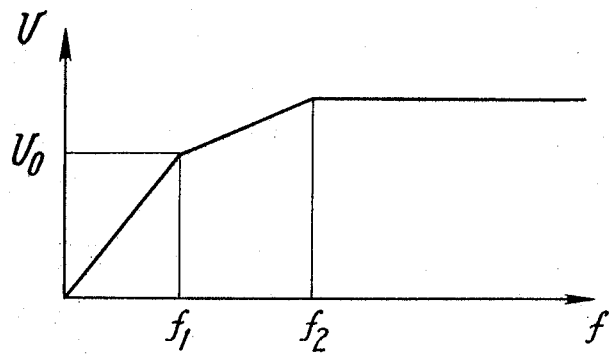
FIG. 7 shows the synchronous generator voltage versus frequency curve.

The value of resistance 47 can be selected so that the current flowing through the control winding 14 depends upon the signal supplied from the bridge 46 only when frequency "f" generated by the synchronous generator 5 is greater than $f_2$ (see FIG. 7). In this case, the value of current $i_{14}$ flowing through the control winding 14 is determined by the following formula:

$$i_{14} = \frac{C_2 V}{r_{14}} \quad (11)$$

where $C_2$ is a constant coefficient.

Consequently, the control circuit maintains the voltage across the terminals of synchronous generator 5 at a constant level.

Thus, the device described above enables the required voltage versus frequency curve to be obtained.

Figure 12:
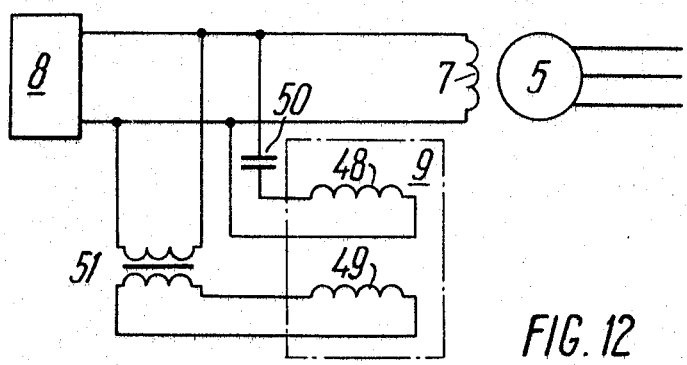
FIG. 12 shows the connection diagram of the magnetic amplifier supplementary windings for stabilizing the operation of the device.

The magnetic amplifier 9 is also provided with supplementary feedback windings 48 and 49 (see FIG. 12) for ensuring steady operation of the device, these windings being intended for receiving signals from the winding 7 of synchronous generator 5 through a capacitor 50 or stabilizing transformer 51.

What is claimed is:

1. A device for voltage control of electric traction motors of an A.C. thermal-electric drive, and more particularly a gas-turbine-electric locomotive provided with a two-shaft gas turbine set, comprising a synchronous generator driven by the gas-turbine set and employed for supplying the A.C. traction motors, said synchronous generator having a field winding, a source of alternating current, a rectifier connected to the source of alternating current for supplying the field winding of the synchronous generator, a magnetic amplifier supplied from said source of alternating current and controlling the voltage of the synchronous generator via said rectifier, said magnetic amplifier having at least three control windings, one of which windings is fed via the rectifier and a functional converter by the current of said electric motors whereby the current in such control winding of the magnetic amplifier is approximately proportional to the ratio of the voltage to the current frequency and said magnetic amplifier varying the excitation of the synchronous generator so that its voltage is changed in proportion to the frequency, a comparator unit, the second control winding of said magnetic amplifier being fed by the voltage of the electric motors via said comparator unit in which the voltage-dedependent signal of the electric motors is compared with the signal dependent on the speed of the thermal prime mover or on the fuel supply means position so that the nature of the relation between the frequency and the voltage of the electric motors begins to change after a certain value of said voltage is attained, said value being in turn variable with changes in the signal of the thermal prime mover, and the signal for said third control winding of the magnetic amplifier being obtained from the thermal prime mover, the current in such winding being proportional to the signal dependent on the speed of the prime mover or on the position of the fuel supply means, whereby the magnitude of the frequency dependent voltage is determined by the operating regime of the thermal prime mover.

2. The device as claimed in claim 1 in which the rectifier connected to the source of alternating current supplies the fuel winding of the synchronous generator via an exciter.

3. The device as claimed in claim 1 in which the signal for the third control winding of the magnetic amplifier and which signal is dependent on the speed of the thermal prime mover and determines a certain relation between the current and the frequency is obtained from an A.C. tachometer-generator driven by the thermal prime mover via a rectifier and a R–L–C resonant circuit.

4. The device as claimed in claim 1 in which for obtaining the signal for the third winding dependent upon the speed of the thermal prime mover, the difference of voltages of a D.C. tachometer-generator driven by the prime mover and of certain constant voltage is applied across said third control winding of the magnetic amplifier.

5. The device as claimed in claim 1 in which said signal dependent on the position of the fuel supply means is produced by a converter of mechanical movements into electrical signals and includes an inductive converter having a movable member linked with the fuel supply means.

6. The device as claimed in claim 1 in which a second rectifier bridge supplied by the voltage of the traction electric motors is connected into the circuit of the first winding of a magnetic amplifier in series with a rectifier bridge connected with the functional converter.

7. The device as claimed in claim 1 in which said magnetic amplifier is provided with an additional control winding connected through a capacitator to the fuel winding of the synchronous generator for ensuring a stable operation.

References Cited

UNITED STATES PATENTS

| | | | |
|---|---|---|---|
| 2,909,779 | 10/1959 | Emery et al. | 290—40 XR |
| 2,929,243 | 3/1960 | Slamar | 318—146 XR |
| 3,183,422 | 5/1965 | Stamm | 290—40 XR |
| 3,189,809 | 6/1965 | Sueker | 318—146 XR |
| 3,263,142 | 7/1966 | Adoutte et al. | 318—143 XR |

GLEN R. SIMMONS, Primary Examiner

U.S. Cl. X.R.

290—40; 318—144, 146